(12) United States Patent
Giolando et al.

(10) Patent No.: US 7,008,481 B2
(45) Date of Patent: Mar. 7, 2006

(54) METHOD AND APPARATUS FOR DEPOSITING A HOMOGENEOUS PYROLYTIC COATING ON SUBSTRATES

(75) Inventors: Dean M. Giolando, Toledo, OH (US); Alan J. McMaster, Maumee, OH (US)

(73) Assignee: Innovative Thin Films, Ltd., Toledo, OH (US)

(*) Notice: Subject to any disclaimer, the term of this patent is extended or adjusted under 35 U.S.C. 154(b) by 18 days.

(21) Appl. No.: 10/429,384

(22) Filed: May 2, 2003

(65) Prior Publication Data

US 2005/0040255 A1 Feb. 24, 2005

Related U.S. Application Data

(60) Provisional application No. 60/383,043, filed on May 24, 2002.

(51) Int. Cl.
*B05B 7/00* (2006.01)
*B05C 5/00* (2006.01)

(52) U.S. Cl. .................. 118/300; 118/612; 118/302

(58) Field of Classification Search .............. 118/300, 118/302, 612; 65/60.1
See application file for complete search history.

(56) References Cited

U.S. PATENT DOCUMENTS 5,687,905 A * 11/1997 Tsai ........................... 239/4
6,607,597 B1 * 8/2003 Sun et al. ................. 118/309

* cited by examiner

*Primary Examiner*—Chris Fiorilla
*Assistant Examiner*—Yewebdar Tadesse
(74) *Attorney, Agent, or Firm*—Fraser Martin Buchanan Miller LLC; Donald R. Fraser

(57) ABSTRACT

A method and apparatus for depositing a homogeneous pyrolytic coating on substrates. These coatings would include insulator, metal and semiconductor films on a glass substrate. The apparatus controls the size and distribution of the spray droplets to improve the uniformity of the coatings.

1 Claim, 10 Drawing Sheets

METHOD AND APPARATUS FOR DEPOSITING A HOMOGENEOUS PYROLYTIC COATING ON SUBSTRATES

This application claims the benefit of 60/383,043 filed May 24, 2002.

FIELD OF THE INVENTION

The invention relates to using liquid spray pyrolysis for the coating of substrates, such as glass plates, for architectural, appliance and electronic applications.

DESCRIPTION OF THE RELATED ARTS

It is known that substrates, such as glass plates, can be coated with films by using an atomized liquid precursor and delivering it to the surface of the substrate to form a coating.

U.S. Pat. No. 6,332,923 to Richard Crawley et al discloses a liquid spray system for depositing coatings on glass. The spray pattern delivered to the substrate would be oval in shape. This would necessarily deposit a non-uniform coating with the coating being thick at the center and thinner at the edge of the pattern. Large substrates would require the uses of multiple spray guns.

U.S. Pat. No. 5,882,368 to Ciro Flacony-Guajardo et al discloses a method and apparatus for coating a hot glass substrate with a mist of fine droplets from a solution of a chemical precursor, by nebulizing a solution with ultrasonic vibration to form a mist of fine droplets; conducting the mist to the hot glass substrate; and depositing the mist on the hot glass substrate to form a coating. The size of the droplet is controlled by the nebulizer.

There is no means of controlling the droplet size after atomization or the homogeneity of the mist deposited on the substrate, in either of the above mentioned patents.

SUMMARY OF THE INVENTION

It is the main objective of the invention to provide an improved pyrolytic spray apparatus for depositing a uniform coating on substrates.

It is also the main objective of the invention to provide an apparatus for depositing a uniform coating on substrates by generating a homogenous mist of liquid droplets by the combined features of the mixing chamber and restriction.

It is also the main objective of the invention for depositing a uniform coating on substrates by regulating the size of the atomized liquid droplet once it leaves the spray gun by regulating the flow of the mist in the mixing chamber.

Still further advantages will become apparent from the study of the following description and accompanying drawings.

DRAWINGS

Figure 1:
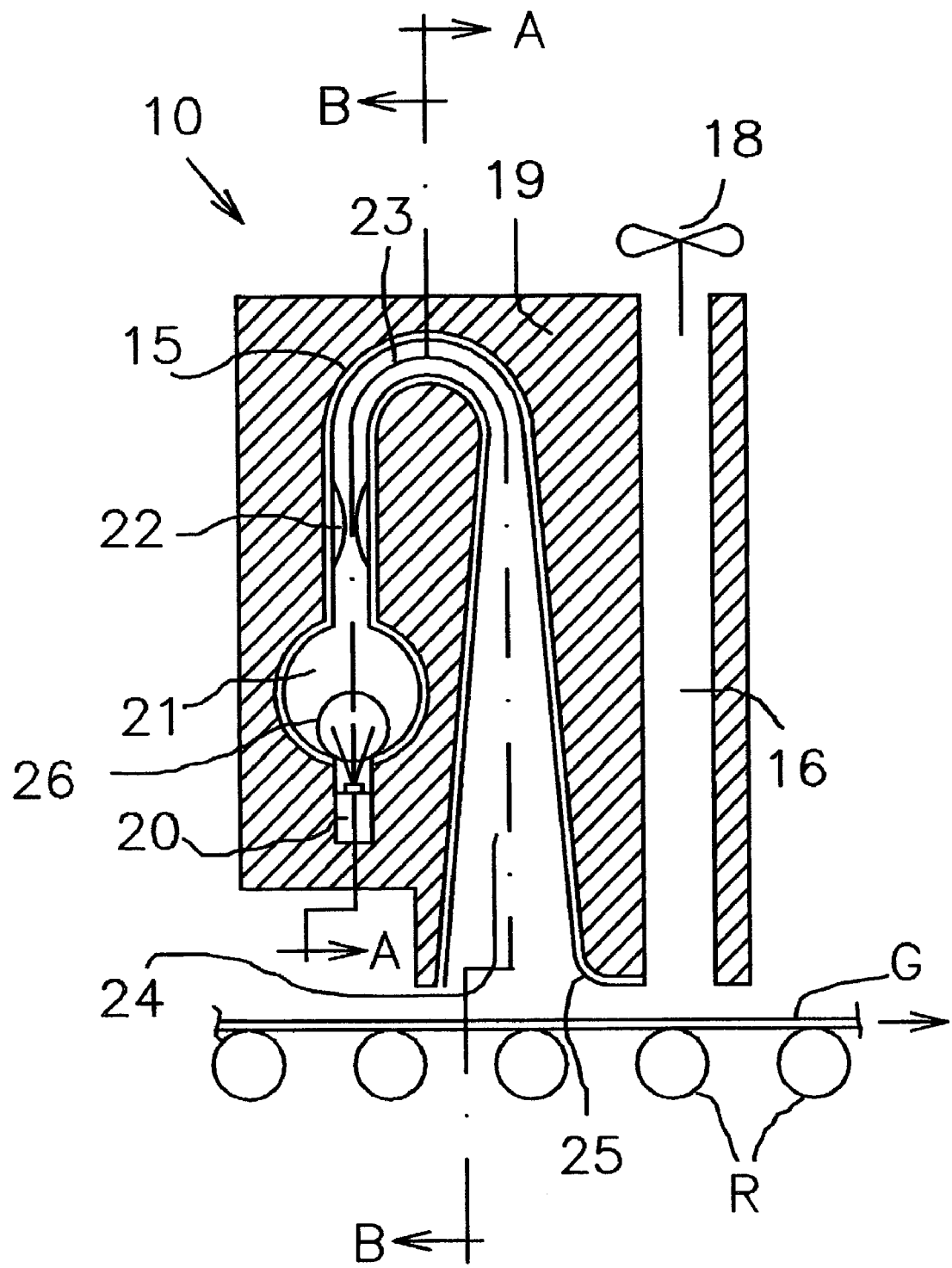
Figure 2:
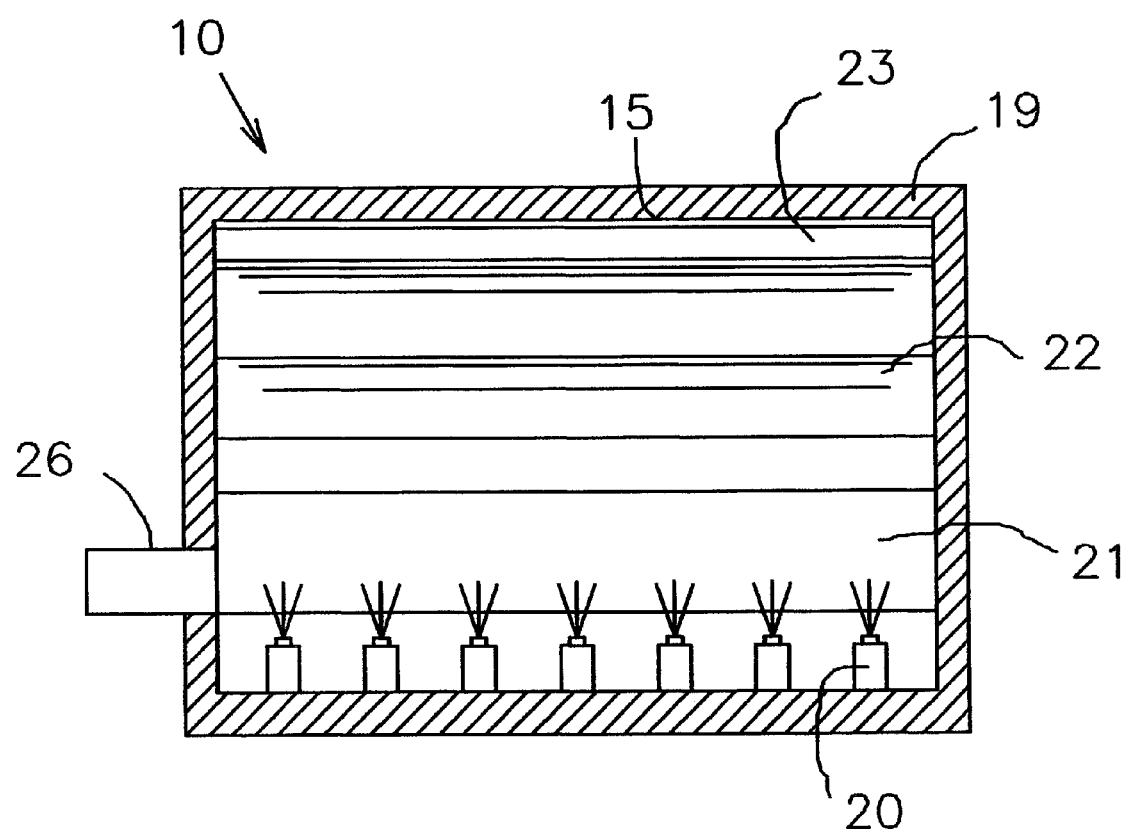
Figure 3:
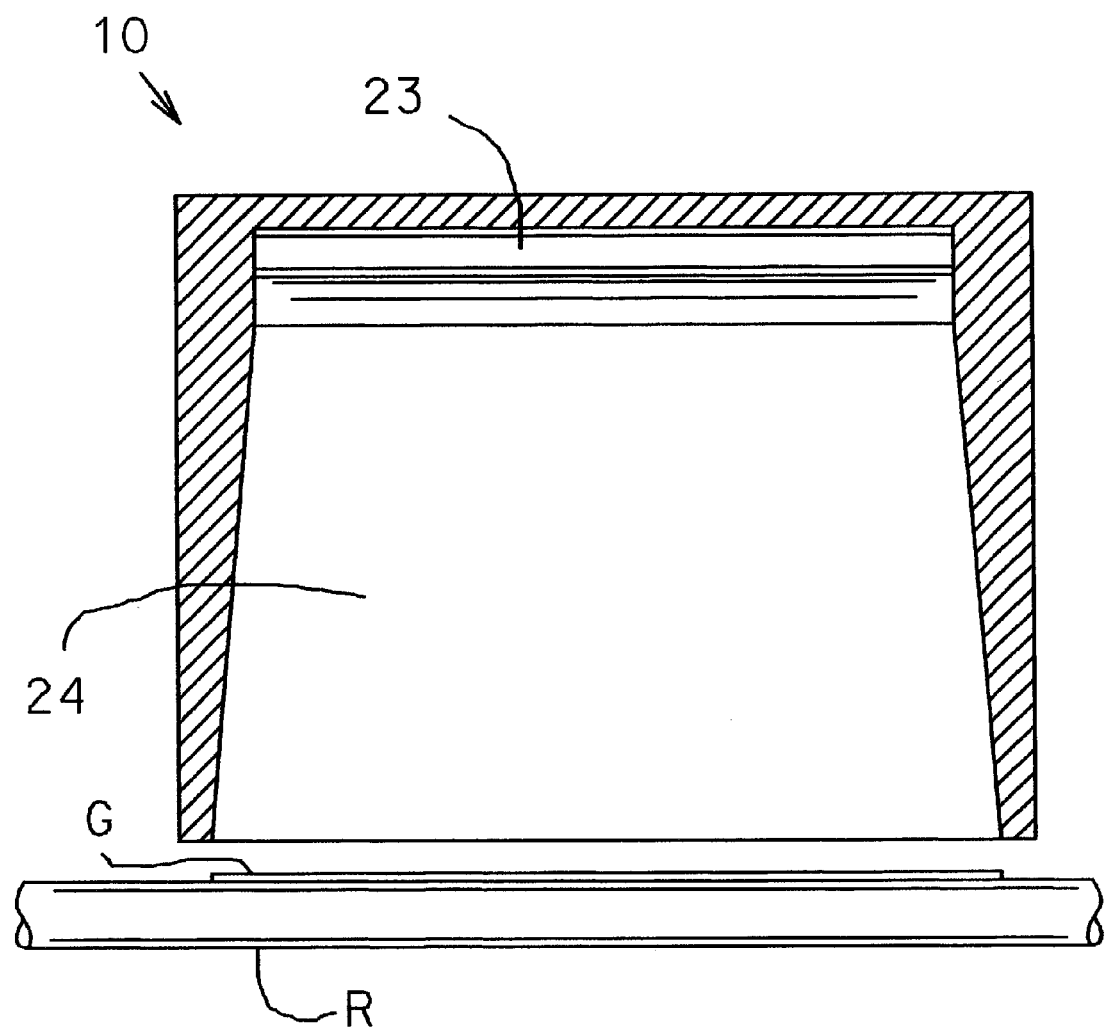
Figure 4:
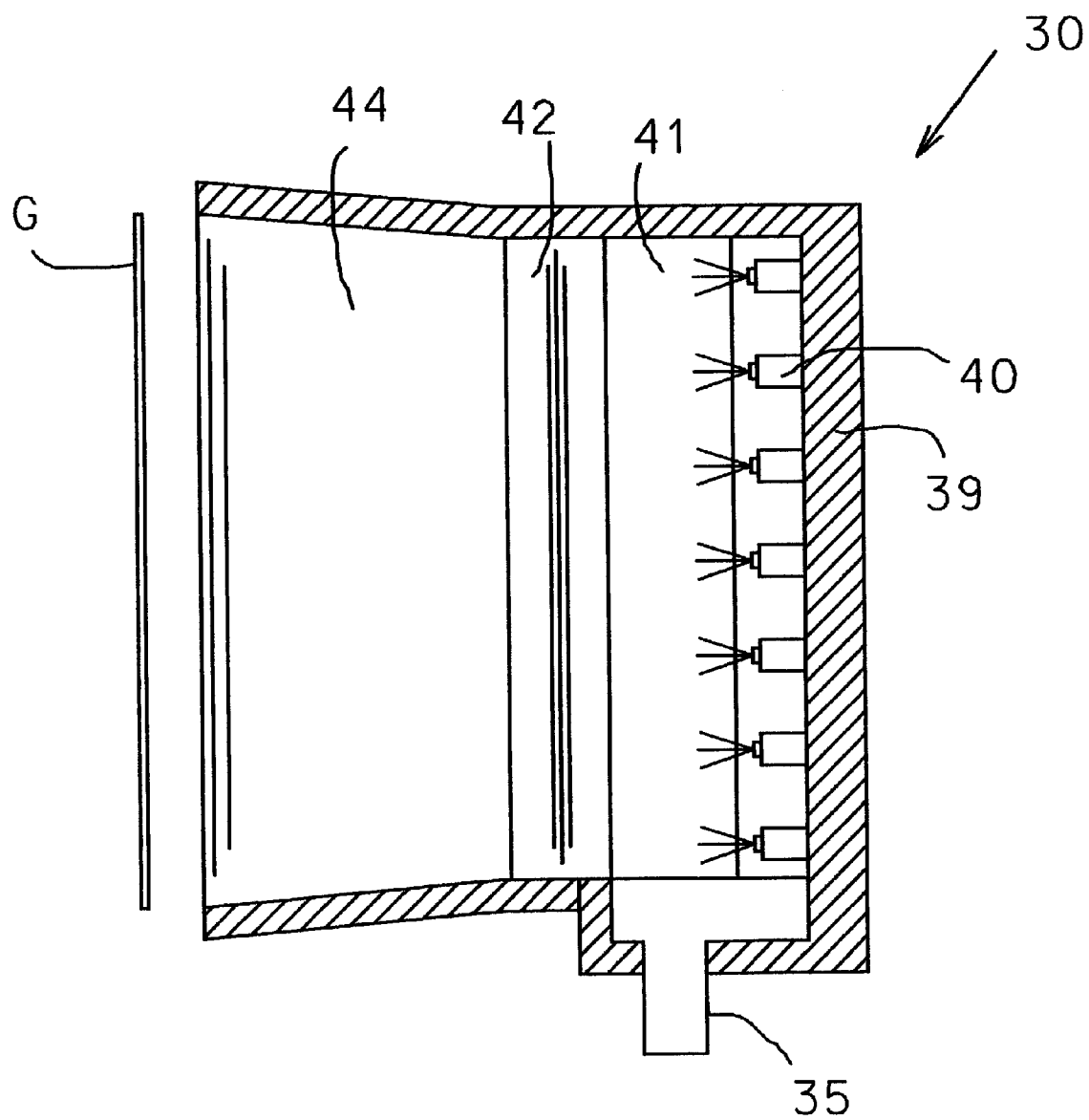
Figure 5:
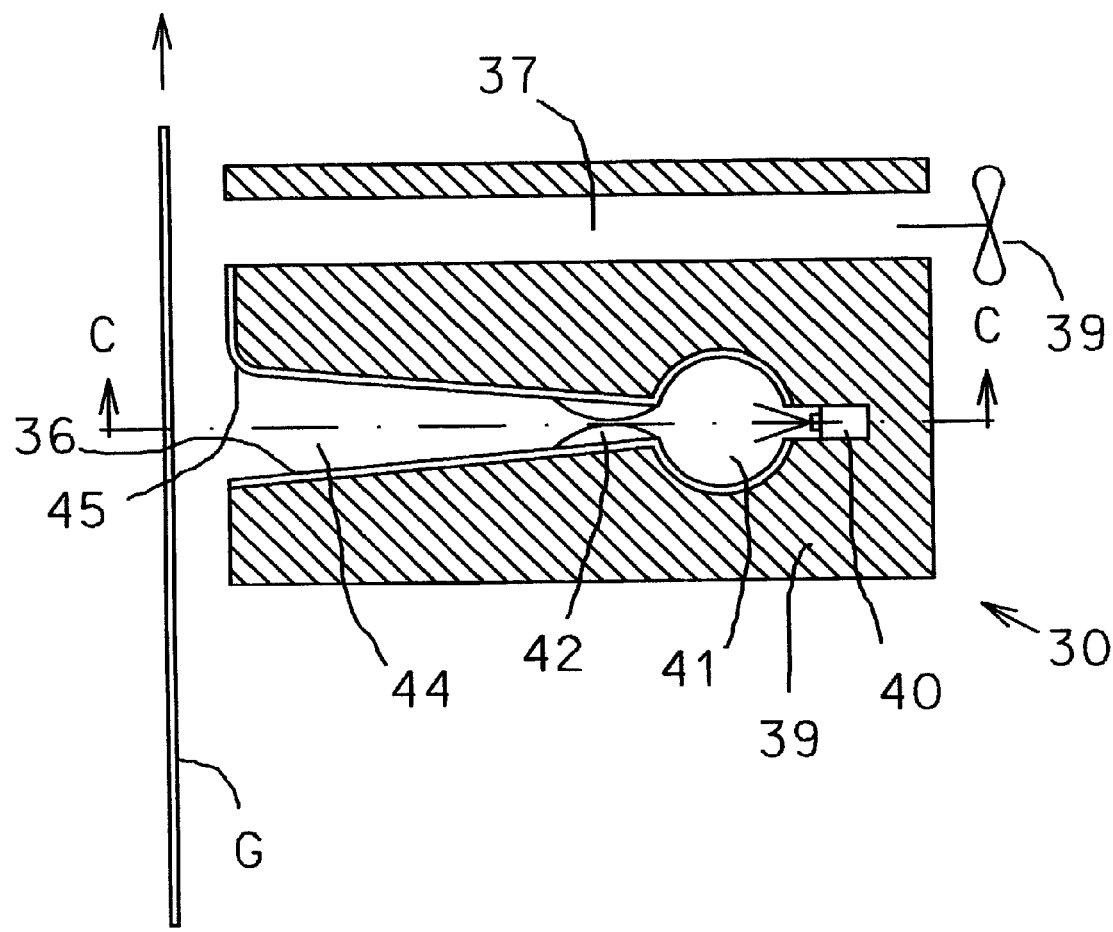
Figure 6:
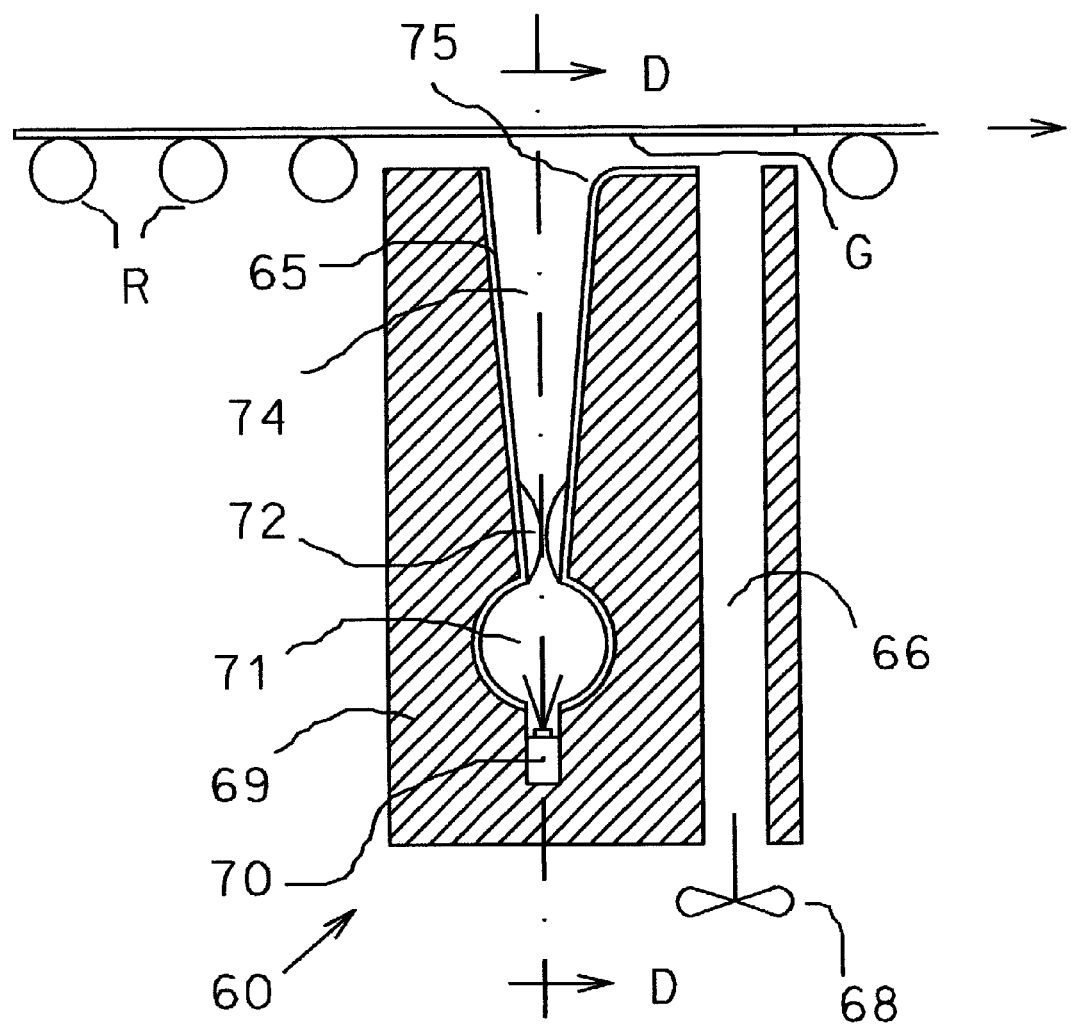
Figure 7:
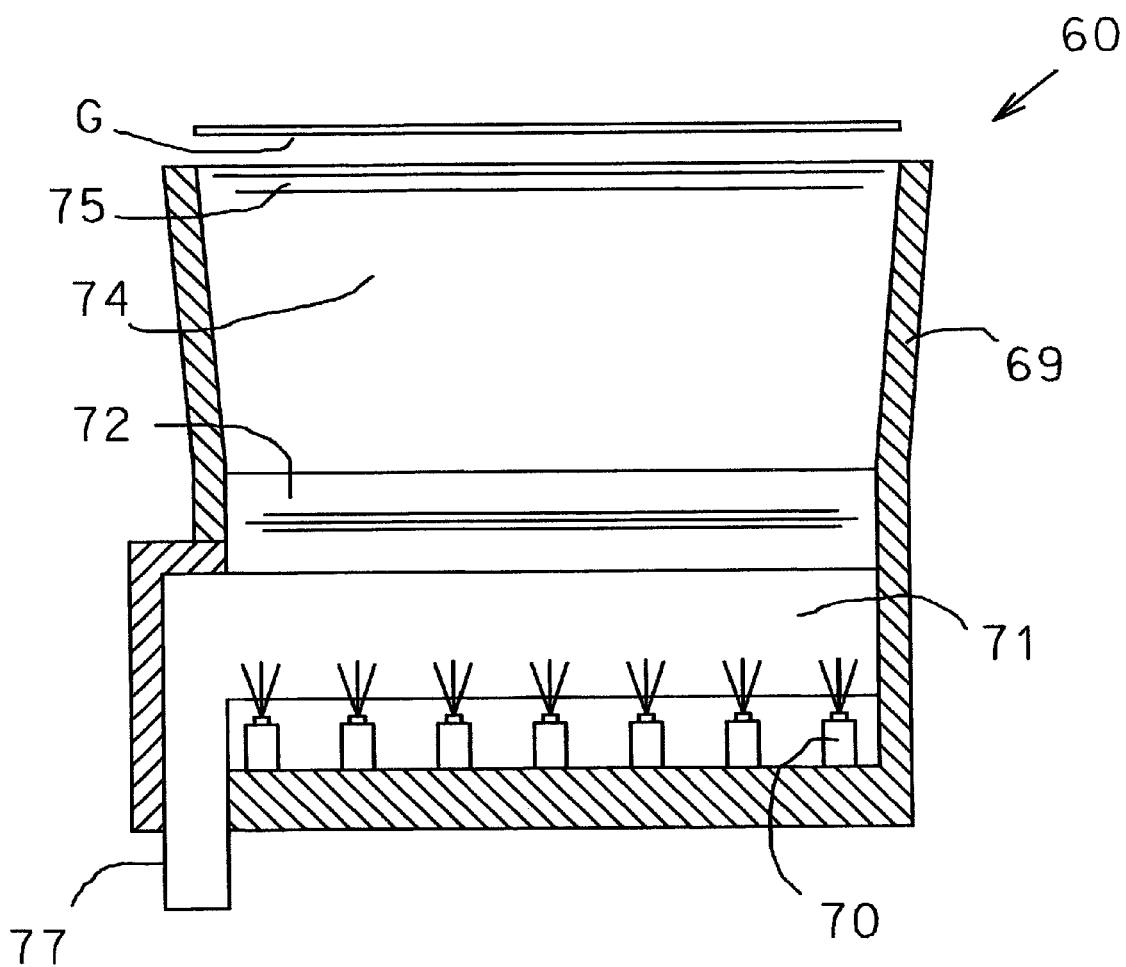

FIG. 1 Vertical cross-sectional view of coating apparatus for coating the top surface of a horizontal substrate:

FIG. 2 Cross-section view taken along line A—A in FIG. 1;

FIG. 3 Cross-section view taken along line B—B in FIG. 1;

FIG. 4 Horizontal cross-sectional view of coating apparatus for coating the surface of a vertical substrate;

FIG. 5 Vertical cross-section view taken along line C—C in FIG. 4;

FIG. 6 Vertical cross-sectional view of coating apparatus for coating the bottom surface of a horizontal substrate; and FIG. 7 Vertical cross-section view taken along line D—D in FIG. 6.

Figure 8:
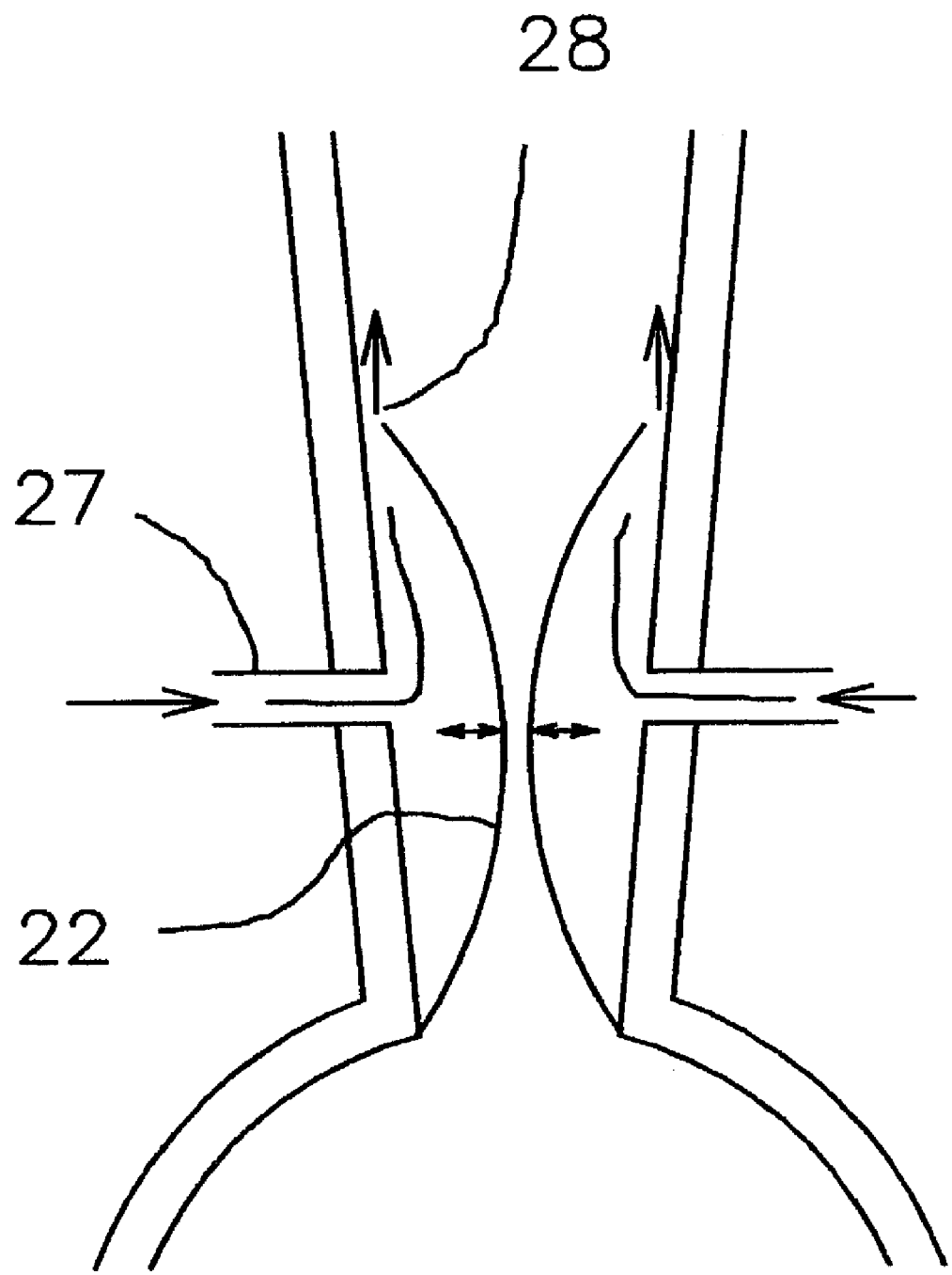

FIG. 8 Close up of screening gas ports in FIG. 1.

Figure 9:
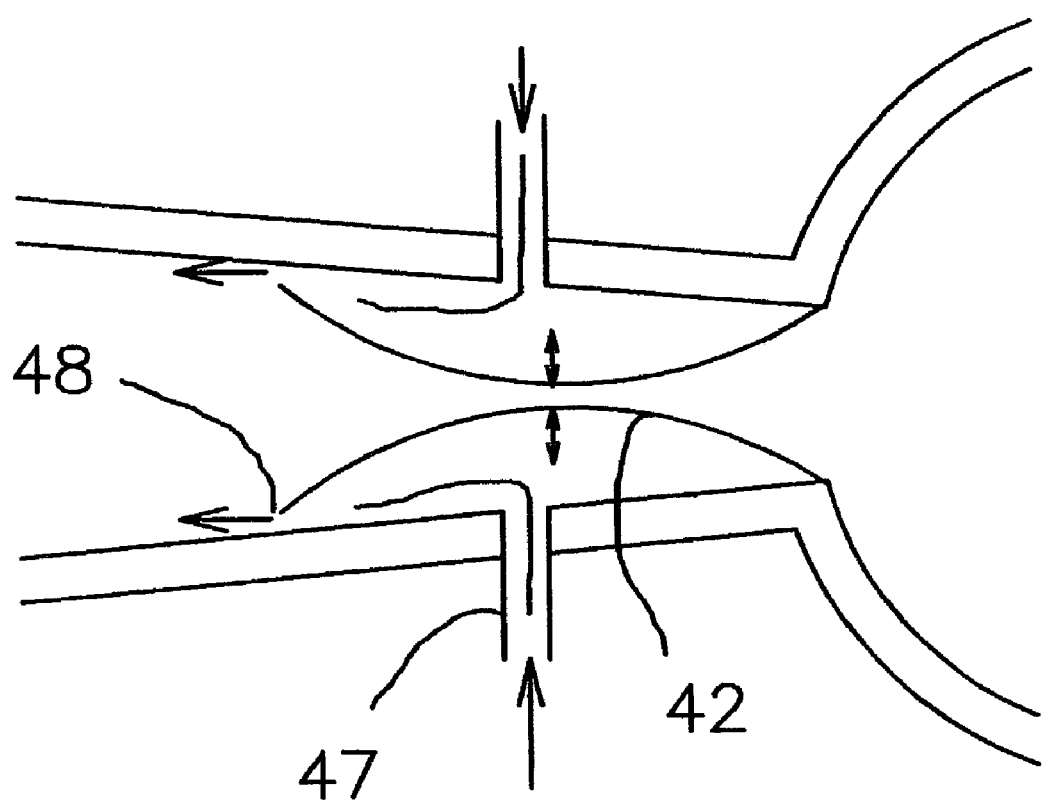

FIG. 9 Close up of screening gas ports in FIG. 4.

Figure 10:
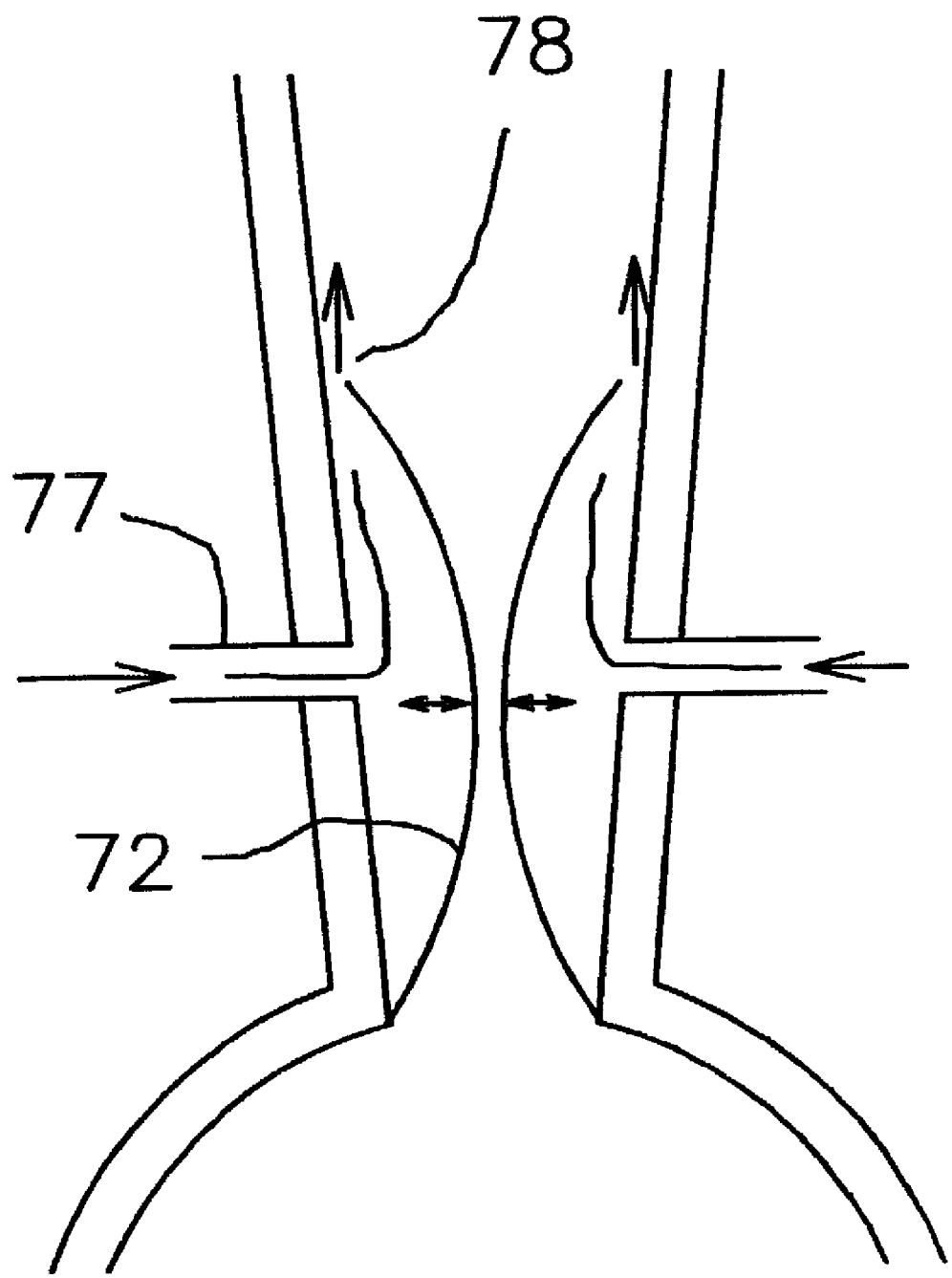

FIG. 10 Close up of screening gas ports in FIG. 6.

DESCRIPTION

FIGS. 1 through 3 and FIG. 8 show a coating apparatus 10 for coating the top surface of a horizontal substrate G. The apparatus 10 contains one or more atomizing spray guns 20, a mixing chamber 21, a restriction 22 in the duct 23 and a diffuser 24 that forms the discharge and is directed downward to the substrate G surface. The opening area of the restriction 22 is smaller than that of the mixing chamber 21 or duct 23. The opening area of the restriction 22 is adjustable. The screening gas ports 27 are connected to the screening gas outlets. 28. The duct 23 and diffuser 24 are rectangular in cross-section. The cross-section area of the diffuser 24 is larger at the discharge end as compared to the end connected to the duct 23. The restriction 22, duct 23, mixing chamber 21 and diffuser 24 are lined with a cooling jacket 15. The exhaust duct 16 is rectangular in cross-section. The discharge of the diffuser 24 has a rounded profile 25 on the side nearest the exhaust duct 16. The exhaust has a blower 18. The apparatus is covered with insulation 19. The mixing chamber has an outlet 26. The coating apparatus 10 is mounted above but in close proximity to the substrate G. The substrate G is supported on rollers R.

FIGS. 4, 5 and 9 show a coating apparatus 30 for coating the surface of a vertical substrate G. The apparatus 30 contains one or more atomizing spray guns 40, a mixing chamber 41, a restriction 42 and a diffuser 44 that forms the discharge and is directed horizontally to the substrate G surface. The opening area of the restriction 42 is smaller than that of the mixing chamber 41. The opening area of the restriction 42 is adjustable. The screening gas ports 47 are connected to the screening gas outlets. 48. The diffuser 44 is rectangular in cross-section. The cross-section area of the diffuser 44 is larger at the discharge end as compared to the end connected to the mixing chamber 41. The restriction 42, mixing chamber 41 and diffuser 44 are lined with a cooling jacket 36. The exhaust duct 37 is rectangular in cross-section. The discharge of the diffuser 44 has a rounded profile 45 on the side nearest the exhaust duct 37. The exhaust has a blower 39. The apparatus is covered with insulation 39. The mixing chamber has an outlet 35. The coating apparatus 30 is mounted in close proximity to the substrate G. The substrate G is supported by suitable means such as tongs (not shown).

FIGS. 6 and 7 show a coating apparatus 10 for coating the bottom surface of a horizontal substrate G. The apparatus 60 contains one or more atomizing spray guns 70, a mixing chamber 71, a restriction 72 and a diffuser 74 that forms the discharge and is directed upward to the substrate G surface. The opening area of the restriction 72 is smaller than that of the mixing chamber 21. The opening area of the restriction 72 is adjustable. The screening gas ports 77 are connected to the screening gas outlets. 78. The diffuser 24 is rectangular in cross-section. The cross-section area of the diffuser 74 is larger at the discharge end as compared to the end connected to the mixing chamber 71. The restriction 72, mixing chamber 71 and diffuser 74 are lined with a cooling jacket 65. The exhaust duct 66 is rectangular in cross-section. The discharge of the diffuser 74 has a rounded profile 75 on the side nearest the exhaust duct 66. The exhaust has a blower 68. The apparatus is covered with insulation 69. The mixing chamber 71 has an outlet 77. The coating apparatus 60 is mounted above but in close proximity to the substrate G. The substrate G is supported on rollers R.

Reference Numbers

| | |
|---|---|
| 10, 30, 60 | coating apparatus |
| 20, 40, 70 | atomizing spray gun |
| 21, 41, 71 | mixing chamber |
| 22, 42, 72 | restriction |
| 27, 47, 77 | screening gas port |
| 28, 48, 78 | screening gas outlet |
| 23 | duct |
| 24, 44, 74 | diffuser |
| 15, 36, 65 | cooling jacket |
| 16, 37, 66 | exhaust duct |
| 25, 45, 75 | rounded profile |
| 26, 35, 77 | outlet |
| 18, 39, 68 | exhaust blower |
| 19, 39, 69 | insulation |
| R | roller |
| G | substrate |

Operation of Invention

Referring to FIGS. 1 through 3 and 8, the apparatus 10 is mounted above the substrate G and is used for the coating of the top surface of a horizontal substrate. In operation a precursor liquid is delivered to the atomizing spray gun(s) 20 contained in the coating apparatus 10. The atomizing spray gun can be of electrostatic, airless, pneumatic, piezo-electric or any other suitable design. The atomized spray enters the mixing chamber 21. The restriction 22 causes a back pressure to be formed in the mixing chamber 21 and uniformly distributes the atomized spray within the mixing chamber 21. The section area of the mixing chamber 21 is large compared to the opening in the restriction 22. The restriction 22 is adjustable to vary the opening. A smaller opening causes more back pressure in the mixing chamber 21. The result is a slower flow velocity of atomized liquid in the mixing chamber 21. The atomized liquid consists of droplets of varying size. As the atomized liquid flows upward towards the restriction 22, the larger droplets fall out of the flow from gravitation forces and are collected in the outlet 26 at the bottom of the mixing chamber 21 to be re-sprayed. The result is a homogeneous atomized liquid with more uniformly sized droplets than otherwise possible. The atomized liquid passes through the restriction 22. At this point there is a pressure drop and an increase in flow velocity. A screening gas is supplied through the screening gas port 27 and flows out the screening gas outlet 28. The screening gas provides a shield to prevent the atomized liquid from depositing upon the duct 23 or diffuser 24. The atomized spray is transported through the duct 23 until it reaches the diffuse 24 where the pressure increases and the flow velocity decreases. This aids in further increasing the uniform distribution of the droplets. The wider opening at the discharge end of the diffuser 24 also aids in preventing the build up of material from decreasing the flow. The atomized liquid is discharged from the diffuser 24 and impinges upon the substrate G forming a coating. The size of the diffuser 24 and duct 23 can be of sufficient size to coat large substrates G. Unused material flows towards the exhaust duct 16 with the aid of the exhaust blower 18. The rounded profile 25 assists in the uniform flow of unused material to the exhaust duct 16. The coating apparatus 10 is protected from heat by a covering of insulation 19. The temperature of the atomized liquid is controlled as it passes through the mixing chamber 21, restriction 22, duct 23 and diffuser 24 by means of the cooling jacket 15. This prevents pre-reaction of the precursor before it is discharge from the diffuser 24. The temperature can also be controlled to prevent the atomized liquid from condensing upon the walls of the cooling jacket 15. In this example, the substrate G is transported past the discharge of the diffuser 24 on rollers R, although, any suitable mode of transport could be used.

Referring to FIGS. 4, 5 and 9, the apparatus 30 is mounted in close proximity to the substrate G and is used for the coating the vertical surface of a substrate. In operation a precursor liquid is delivered to the atomizing spray gun(s) 40 contained in the coating apparatus 30. The atomizing spray gun can be of electrostatic, airless, pneumatic, piezo-electric or any other suitable design. The atomized spray enters the mixing chamber 41. The restriction 42 causes a back pressure to be formed in the mixing chamber 41 and uniformly distributes the atomized spray within the mixing chamber 41. The section area of the mixing chamber 41 is large compared to the opening in the restriction 42. The restriction 42 is adjustable to vary the opening. A smaller opening causes more back pressure in the mixing chamber 41. The result is a slower flow velocity of atomized liquid in the mixing chamber 41. The atomized liquid consists of droplets of varying size. As the atomized liquid flows laterally towards the restriction 42, the larger droplets fall out of the flow from gravitation forces and are collected in the outlet 35 at the bottom of the mixing chamber 41 to be re-sprayed. The result is a homogeneous atomized liquid with more uniformly sized droplets than otherwise possible. The atomized liquid passes through the restriction 42. At this point there is a pressure drop and an increase in flow velocity. A screening gas is supplied through the screening gas port 47 and flows out the screening gas outlet 48. The screening gas provides a shield to prevent the atomized liquid from depositing upon the diffuser 44. The atomized spray is transported through the diffuser 44 where the pressure increases and the flow velocity decreases. This aids in further increasing the uniform distribution of the droplets. The wider opening at the discharge end of the diffuser 44 also aids in preventing the build up of material from decreasing the flow. The atomized liquid is discharged from the diffuser 44 and impinges upon the substrate G forming a coating. The size of the diffuser 44 can be of sufficient size to coat large substrates G. Unused material flows towards the exhaust duct 37 with the aid of the exhaust blower 38. The rounded profile 45 assists in the uniform flow of unused material to the exhaust duct 37. The coating apparatus 30 is protected from heat by a covering of insulation 39. The temperature of the atomized liquid is controlled as it passes through the mixing chamber 41, restriction 42 and diffuser 44 by means of the cooling jacket 36. This prevents pre-reaction of the precursor before it is discharge from the diffuser 44. The temperature can also be controlled to prevent the atomized liquid from condensing upon the walls of the cooling jacket 36. The substrate G is transported vertically past the discharge of the diffuser 44 by any suitable mode of transport.

Referring to FIGS. 6, 7 and 10, the apparatus 60 is mounted in close proximity to the substrate G and is used for the coating the bottom surface of a horizontal substrate. In operation a precursor liquid is delivered to the atomizing spray gun(s) 70 contained in the coating apparatus 60. The atomizing spray gun can be of electrostatic, airless, pneumatic, piezoelectric or any other suitable design. The atomized spray enters the mixing chamber 71. The restriction 72 causes a back pressure to be formed in the mixing chamber 71 and uniformly distributes the atomized spray within the mixing chamber 71. The section area of the mixing chamber 71 is large compared to the opening in the restriction 72. The restriction 72 is adjustable to vary the opening. A smaller opening causes more back pressure in the mixing chamber 71. The result is a slower flow velocity of atomized liquid in the mixing chamber 71. The atomized liquid consists of droplets of varying size. As the atomized liquid flows upward towards the restriction 72, the larger droplets fall out of the flow from gravitation forces and are collected in the outlet 77 at the bottom of the mixing chamber 71 to be re-sprayed. The result is a homogeneous atomized liquid with more uniformly sized droplets than otherwise possible. The atomized liquid passes through the restriction 72. At this point there is a pressure drop and an increase in flow velocity. A screening gas is supplied through the screening gas port 77 and flows out the screening gas outlet 78. The screening gas provides a shield to prevent the atomized liquid from depositing upon the diffuser 74. The atomized spray is transported through the diffuser 74 where the pressure increases and the flow velocity decreases. This aids in further increasing the uniform distribution of the droplets. The wider opening at the discharge end of the diffuser 74 also aids in preventing the build up of material from decreasing the flow. The atomized liquid is discharged from the diffuser 74 and impinges upon the substrate G forming a coating. The size of the diffuser 74 can be of sufficient size to coat large substrates G. Unused material flows towards the exhaust duct 66 with the aid of the exhaust blower 68. The rounded profile 75 assists in the uniform flow of unused material to the exhaust duct 66. The coating apparatus 60 is protected from heat by a covering of insulation 69. The temperature of the atomized liquid is controlled as it passes through the mixing chamber 71, restriction 72 and diffuser 74 by means of the cooling jacket 65. This prevents pre-reaction of the precursor before it is discharge from the diffuser 74. The temperature can also be controlled to prevent the atomized liquid from condensing upon the walls of the cooling jacket 65. The substrate G is transported horizontally past the discharge of the diffuser 44 by any suitable mode of transport such as rollers R.

The invention claimed is:

1. A coating apparatus for coating the surface of a substrate, comprising:

a liquid atomizer;

a mixing chamber for receiving atomized liquid;

a mixing chamber outlet for collecting unused material;

a restriction in communication with the mixing chamber wherein the opening in the restriction is smaller in area than the mixing chamber cross-section area;

a diffuser in communication with the restriction wherein the discharge end of the diffuser is larger than the inlet end; and an exhaust duct adjacent the substrate and the discharge end of the diffuser.

* * * * *